(12) United States Patent
Bergman et al.

(10) Patent No.: US 10,863,424 B2
(45) Date of Patent: Dec. 8, 2020

(54) TECHNIQUE FOR TRANSMITTING DISCOVERY-RELATED SIGNALS FROM A TRANSMISSION POINT TO A USER EQUIPMENT

(71) Applicant: Telefonaktiebolaget LM Ericsson (publ), Stockholm (SE)

(72) Inventors: Svante Bergman, Hägersten (SE); Sebastian Faxér, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/091,543

(22) PCT Filed: Apr. 27, 2016

(86) PCT No.: PCT/EP2016/059419
§ 371 (c)(1),
(2) Date: Oct. 5, 2018

(87) PCT Pub. No.: WO2017/186288
PCT Pub. Date: Nov. 2, 2017

(65) Prior Publication Data
US 2019/0124587 A1  Apr. 25, 2019

(51) Int. Cl.
*H04W 48/16* (2009.01)
*H04B 7/06* (2006.01)

(52) U.S. Cl.
CPC .......... *H04W 48/16* (2013.01); *H04B 7/0617* (2013.01)

(58) Field of Classification Search
CPC ......... H04L 41/12; H04L 45/02; H04L 45/00; H04L 45/04; H04W 84/18
(Continued)

(56) References Cited

U.S. PATENT DOCUMENTS 6,286,047 B1 * 9/2001 Ramanathan ..... H04L 29/12066
370/229
6,446,008 B1 * 9/2002 Ozbek ..................... G01V 1/364
702/17
(Continued)

FOREIGN PATENT DOCUMENTS

JP    WO2015025838 A * 2/2015 ............ H04W 16/28
WO   2009049217 A1    4/2009
(Continued)

OTHER PUBLICATIONS

Office Action issued in corresponding EP application No. 16719848.0; dated Nov. 18, 2019; 8 pages.

*Primary Examiner* — Peter G Solinsky
*Assistant Examiner* — Sanjay K Dewan
(74) *Attorney, Agent, or Firm* — Patent Portfolio Builders, PLLC

(57) ABSTRACT

A technique for transmitting discovery-related signals from a transmission point to a UE is disclosed, wherein the transmission point (TP) is adapted to transmit at least two distinct discovery-related signals to be received by the UE. A method aspect (in the TP) comprises transmitting the first discovery-related signal by applying a first beamforming, and transmitting the second discovery-related signal by applying a second beamforming, wherein the steps of transmitting are performed simultaneously in a time domain and/or a space domain, and wherein the first and second beamforming are different. A further method aspect (in the UE) comprises detecting, in the received discovery-related signalling, at least one discovery-related signal in at least the first beam and/or the second beam from the transmission point based on a received distinction between discovery-related signals on the first beam or the second beam, wherein the first beam is different from the second beam.

21 Claims, 4 Drawing Sheets

(58) Field of Classification Search
USPC .......................................................... 370/254
See application file for complete search history.

(56) References Cited

U.S. PATENT DOCUMENTS

| | | | |
|---|---|---|---|
| 9,436,835 B1* | 9/2016 | Saldamli | ................ G06F 21/602 |
| 10,505,615 B2* | 12/2019 | Islam | ................ H04W 72/0413 |
| 2002/0086708 A1 | 7/2002 | Teo et al. | |
| 2005/0272472 A1* | 12/2005 | Goldberg | .............. H04W 16/28 455/562.1 |
| 2006/0276228 A1* | 12/2006 | Jin | ...................... H04B 7/0617 455/562.1 |
| 2010/0103900 A1* | 4/2010 | Yeh | ...................... H04B 7/0695 370/330 |
| 2014/0120851 A1* | 5/2014 | Steele | .................. H04B 1/1036 455/90.2 |
| 2016/0212631 A1 | 7/2016 | Shen et al. | |
| 2017/0033904 A1* | 2/2017 | Stirling-Gallacher | ...................... H04L 5/0023 |
| 2018/0206217 A1* | 7/2018 | Martin | ................ H04W 72/044 |

FOREIGN PATENT DOCUMENTS

| | | | | |
|---|---|---|---|---|
| WO | 2015025838 A1 | 2/2015 | | |
| WO | 2015156491 A1 | 10/2015 | | |
| WO | 2015171039 A1 | 11/2015 | | |
| WO | 2016022235 A1 | 2/2016 | | |
| WO | WO 2016/022235 A1 * | 2/2016 | ............... H04B 7/04 |

* cited by examiner

TECHNIQUE FOR TRANSMITTING DISCOVERY-RELATED SIGNALS FROM A TRANSMISSION POINT TO A USER EQUIPMENT

TECHNICAL FIELD

The present disclosure generally relates to transmitting discovery-related signals from a transmission point to a user equipment (UE), wherein the transmission point is adapted to transmit at least two distinct discovery-related signals. In an aspect, the present disclosure is concerned with spatial multiplexing of discovery-related signals with different beam patterns. The techniques of the present disclosure may be embodied in methods and/or apparatuses.

BACKGROUND

In a cellular communications system, a UE must first connect to a network and then synchronize to a serving cell before data transmission can be started. To enable this, most cellular systems define some kind of discovery signal. Generally, the discovery(-related) signal referred to in this disclosure may be comprised of one or more reference signals. That is, a discovery signal may comprise a set of reference signals. The discovery signal serves multiple purposes. First of all, a UE must be able to detect that a base station/cell (or transmission point) is present. Therefore, all cells in the network usually transmit a discovery signal.

After detecting that a cell is present, a UE must then acquire the correct symbol and frame timing—so called time synchronization. For an Orthogonal Frequency Division Multiplex (OFDM)-based system, this entails estimating the start of the OFDM symbol so that the time-domain signal can be transformed into frequency-domain by means of a Fast Fourier Transform (FFT). The UE must also derive where in the larger frame structure the current OFDM symbol is located. After time synchronization is acquired, the UE must try to compensate for a possible offset between the frequency of the local oscillator (LO) at the cell and the frequency of its own LO as well as additional frequency offset due to e.g. Doppler shift—so called frequency synchronization.

When time and frequency synchronization is acquired, a UE will typically decode some kind of broadcast signal in order to retrieve some kind of system information. The system information would generally comprise some cell specific settings that enable the UE to continue its cell search procedure, such as information about how to behave on the random access channel (RACH). A UE would then typically measure upon some kind of reference signal (that may or may not be included in the discovery signal) in order to estimate the strength of the signal transmitted from the cell, the so called Reference Signal Received Power (RSRP). As a UE would typically hear multiple discovery signals transmitted from different cells, it would have to choose which one out of multiple candidate cells to connect to, and make the choice based on the estimated signal strength of each cell.

As seen, the discovery signal serves multiple purposes and may thus be comprised of a set of reference signals—one for each purpose. For initial time and frequency synchronization, it is common to use some kind of so called Constant Amplitude Zero Auto-Correlation (CAZAC) sequence as a reference signal. Such a sequence, which may be described by a sequence of complex values x[n], n=0, . . . N−1 has the property that amplitude $|x[n]|^2=1$ meaning that only the phase is changed; and more importantly that the cyclic auto-correlation $$R(m) = \sum_{n=0}^{N} x[n] \cdot x[\mathrm{mod}(n+m, N)]$$

is zero for m≠0. This means that if the sequence x[n], n=0, . . . N−1 is mapped to a set of time-frequency resource elements (TFREs), a UE can correlate the received signal (in time or frequency) with the sequence x[n] in order to find where in the time-frequency resource grid the reference signal is located. As the autocorrelation is zero for m≠0 but non-zero for m=0, a clear peak will be seen when correlating over the TFREs where the reference signal is located. Furthermore, since only the phase difference between the different symbols in the sequence matters, the UE does not need knowledge on any coherent channel. Thus, both symbol and (coarse) frequency synchronization can be achieved by this methodology. The additional frequency offset—that is not a multiple of the subcarrier bandwidth—can further be corrected by for instance measuring the phase shift between the end of the OFDM symbol and the cyclic prefix at the beginning of the OFDM symbol (which contains the same data as the end of the OFDM symbol).

It is also known to use a special kind of CAZAC sequences called Zadoff-Chu (ZC) sequences. These sequences $x_u[n]$, n=0 . . . , N−1, parameterized by the variable u, have another set of desirable properties. First, the Discrete Fourier Transform (DFT) of a ZC sequence is another ZC sequence, meaning that a ZC sequence mapped to the frequency domain can be found by correlating the time-domain signal. This is done for instance with the Primary Synchronization Signal (PSS) in Long Term Evolution (LTE). Further, the cross-correlation $$R_{u_1, u_2}(m) = \sum_{n=0}^{N} x_{u_1}[n] \cdot x_{u_2}[\mathrm{mod}(n+m, N)]$$

between ZC sequences with different values of u is constant and low. This means that a UE may easily distinguish between different ZC sequences and information may be encoded by the choice of sequence.

After the UE has made the initial connection to the network and synchronized to a serving cell, it would still monitor the discovery signals transmitted from other cells due to that other cells might become more attractive as the UE moves around. It should thus always monitor the discovery signals of other cells and calculate the corresponding RSRP in order to determine when a handover to another cell should be requested. Typically, a UE would request a handover by reporting e.g. the RSRP value of a candidate cell, if the RSRP of the candidate cell is a predetermined offset larger than the RSRP of its serving cell.

Discovery signal measurements may also be used as input to Coordinated MultiPoint (CoMP) operation. Typically, discovery signals transmitted from adjacent cells would be used for acquiring channel knowledge that can be used for e.g. blanking, null-forming or coordinated scheduling or link adaptation.

The coverage of the discovery signal is of uttermost importance since it essentially defines the coverage region of the cell. If the cell cannot be discovered it does not matter if the coverage for data transmission would be good. This is especially true for higher frequency bands, where the coupling loss generally is larger because of the smaller antenna aperture size due to the decreased wavelength of the carrier frequency. At those frequencies it is of paramount importance to use multi-antenna techniques such as beamforming to increase the received power and consequently decrease the coupling loss. It is thus important to use beamforming not only for the downlink data transmission but also for the discovery signals so that the coverage of the discovery signals is not smaller than the coverage for data transmission.

However, in a realistic scenario there is typically a great diversity in UE propagation conditions. Some UEs, typically located at the cell center, might not be coverage-limited at all and might not actually require that the discovery signals are beamformed. Other UEs though, typically located at the cell edge, might be very coverage-limited. Most often, a UE would be coverage-limited with respect to at least some non-serving cells.

One approach is to transmit the discovery signal using a narrow beam to obtain a beamforming gain. Generally, a larger the antenna aperture allows for more beamforming gain, which in turn results in an increased received power (e.g. RSRP), improving the coverage. On the other hand, a UE that is not located in the main lobe of the beam will not benefit from this beamforming gain. It will in fact receive almost no power since the energy is located in another direction. In order to cover a larger area with a beamformed discovery signal one may dynamically steer the pointing direction of the narrow beam so as to sweep all relevant azimuth and/or elevation angles over time, a technique denoted here as beam cycling. The UE will then listen for the discovery signal continuously and when the beam hits the UE, it will detect the signal and connect to the system.

Another approach is to have a discovery signal that is not beamformed but rather transmitted more uniformly in space over the coverage area of interest. The signal will be weaker due to the lack of a beamforming gain, but for many UEs that have a sufficiently strong channel it will anyway be sufficient for detecting the discovery signal. With a wide beam discovery signal, such a UE would not need to wait until the beam hits the UE since the beam would always cover the coverage area. For the more coverage limited UEs where a wide beam is not sufficiently strong for detection, and given that the channel to such UEs does not change fast over time, one possibility is to improve the coverage by measuring over time to average out noise and interference. That is, an average over multiple transmissions of the discovery signal is calculated in order to do coherent combing over time, and thus a power gain is received. Similar to beam cycling this technique allows the system to trade in detection time to compensate for lack of coverage, albeit in a different way.

However, the following, hitherto unnoticed problems with the prior art have been identified by the present inventors. Namely, the existing solutions for transmission of discovery signals from antenna arrays either suffers from long time durations due to beam cycling, or from sensitivity towards channel variations in the case of temporal averaging of non-beamformed discovery signals.

SUMMARY

Accordingly, there is a need for an implementation of a scheme that avoids one or more of the problems discussed above, or other related problems.

In a first aspect, there is provided a method for transmitting discovery-related signals from a transmission point to a user equipment, UE, wherein the transmission point is adapted to transmit at least two distinct discovery-related signals, the method being performed in the transmission point and comprising the steps of transmitting a first one of the at least two discovery-related signals by applying a first beamforming, and transmitting a second one of the at least two discovery-related signals by applying a second beamforming, wherein the steps of transmitting are performed simultaneously in at least one of a time domain and a space domain, and wherein the first beamforming is different from the second beamforming.

Accordingly, the first and second beamforming processes can be utilized so as to exploit the advantages of both beamforming processes simultaneously.

In a first refinement pertaining to the first aspect, the steps of transmitting being performed in the time domain may comprise the discovery-related signal being transmitted such that the discovery-related signal covers the same spatial region over time. In this way, constant coverage regardless of a time instance is provided. Still further, the steps of transmitting being in the space domain may comprise the discovery-related signal such that the discovery-related signal covers different spatial regions at different times. In this way, improved spatial coverage on a time varying basis is provided.

In a second refinement pertaining to the first aspect, the method may further comprise configuring the transmission point to transmit at least two distinct discovery-related signals. In this way, the TP has all means to transmit the at least two discovery-related signals.

In a third refinement pertaining to the first aspect, the first beamforming may be narrow beamforming. In this case, applying narrow beam forming may comprise spatially sweeping a coverage area of the transmission point. In the latter case, the narrow beam may be configured to sweep at least one of different azimuth angles and elevation angles over time. In addition or alternatively, the narrow beam may be based on a respective column of one of a discrete Fourier transform, DFT, matrix, and a Vandermonde matrix corresponding to an antenna array of the transmission point. Further, a separate reference signal sequence may be used for each beam pointing direction within a sweep of the narrow beam. Alternatively, a same reference signal sequence may be used in each beam sweep. In this way, the advantages of narrow beamforming are exploited, such as providing coverage to UEs that are not able to detect the second beam (e.g. a broad beam) e.g. due to insufficient coverage. Still further, in this way, the narrow beam may be constructed by applying specific beam weights to the discovery signal intended for an antenna array so as to let the discovery signal constructively add coherently in a specific direction in at least one of an azimuth angle or elevation angle.

In a fourth refinement of the first aspect, the second beamforming may be broad beamforming. If so, applying broad beam forming may comprise covering, during the transmission of the broad beam, a coverage area of the transmission point. In this case, the broad beam may be generated by transmitting on one single antenna element of an antenna array of the transmission point. If so, the one single antenna element may be changed over time within the antenna array; alternatively, the broad beam may be generated by transmitting on all antenna elements of the antenna array while applying a pseudo-random phase shift to each antenna element in the antenna array. Moreover, the broad beam may have significantly lower power in the direction of the narrow beam than in the other directions. Accordingly, the advantages of broad beamforming may be exploited, such as allowing UEs with good coverage to detect the access point in a short amount of time. Still further, concerning the pseudo-random phase shift, it is possible to design (or select) to produce a broad beam, such that having the signals from the antenna elements to coherently superposition in any elevation and azimuth angle is specifically avoidable.

In a fifth refinement of the first aspect, the discovery-related signals may be one or more of discovery signals, cell-defining signals and synchronization signals. In addition or alternatively, each of the at least two distinct discovery-related signals may be configured to be transmitted on time-frequency resource elements, TFREs, within a physical resource configuration, wherein the physical resource configuration specifies a subset of all TFRE in the resource element grid. If so, the transmission on the TFREs may be performed with different levels of non-zero power for the at least two distinct discovery-related signals. Alternatively, the method may further comprise allocating the at least two discovery related signals on separate non-overlapping time-frequency resource elements, TFREs, within split physical resource configurations so that each of the at least two distinct discovery-related signals is transmitted on a different physical resource configuration, wherein each physical resource configuration specifies a subset of all TFRE in the resource element grid. In that case, more TFREs may be allocated to the narrow beam than the broad beam; conversely, more TFREs may be allocated to the broad beam than the narrow beam. In this way, the present invention can be implemented with minimum effort while maximizing re-usage of existing resources.

In a sixth refinement of the first aspect, the method may further comprise multiplexing each of the at least two distinct discovery-related signals to be transmitted on a same time-frequency resource element, TFRE, in a physical resource configuration using an orthogonal cover code. In addition or alternatively, the narrow beam may be transmitted with higher power that the broad beam; conversely, the broad beam may be transmitted with higher power that the narrow beam. Further, plural narrow beams may be multiplexed along with the broad beam. Accordingly, it is possible to not compromise on the number of physical resources put on the discovery signalling.

In a seventh refinement of the first aspect, plural narrow beams may be beamformed with a beamformer having at least two strong lobes. In this case, the strong lobes may be grating lobes. In this way, it is possible to cover a larger space in a shorter time.

In a second aspect, there is provided a method for receiving discovery-related signals from a transmission point, the method being performed in a user equipment, UE, and comprising the steps of detecting, in the received discovery-related signalling, at least one discovery-related signal in at least one of a first beam and a second beam from the transmission point based on a received distinction between discovery-related signals on the first beam or the second beam, wherein the first beam is different from the second beam. Accordingly, the first and second beamforming processes can be utilized so as to exploit the advantages of both beamforming processes at the same time.

In a first refinement of the second aspect, the method may further comprise configuring the UE to attempt detection of at least one distinct discovery-related signal in a first beam and in a second beam. In addition or alternatively, the first beam may be a narrow beam and the second beam may be a broad beam. If so, the distinction may reside in the narrow beam's discovery-related signals being assigned to a first subset of sequences and in the broad beam's discovery-related signals being assigned to a second subset of sequences, the first subset being different from the second subset. In that case, the UE may be configured to temporal filtering of the discovery-related signal based on the second subset of sequences. This would be useful, in particular for the implementation of the broad beam, if the discovery signal is labeled as a broad beam signal type, since the probability of detection is not expected to vary over time when the discovery signal is not beam cycled.

In a second refinement of the second aspect, based on the first and second subsets, the UE may determine to perform one of repeatedly attempting to detect the discovery-related signal, and attempting to detect the discovery related signal only every N-th transmission occurrence, N being an integer greater than 1. In this case, as for the narrow beamforming, system resources can be saved by not using every single transmission occurrence.

In a third refinement of the second aspect, the method may further comprise reporting, to a network, a point in time at which the discovery-related signal was received. In that case, the point in time may be one of an absolute point in time taken from a source known to both the network and the UE, and a relative point in time relative to the point in time of reporting. In addition or alternatively, the method may further comprise reporting, to a network, detection of the discovery-related signal at at least one of a predetermined point in time, and a predetermined interval in relation to the point in time of detection. Accordingly, the network may be able to determine the beam pointing direction based on reporting time.

In a fourth refinement of the second aspect, the UE may identify an identifier for the beam pointing direction discovered by the UE and signals back the identifier to the network. Alternatively, the UE may coherently combine the received discovery-related signal over several discovery-related signal occasions. In this way, received power/beam directivity can be improved.

In a fifth refinement of the second aspect, if the UE detects one of the narrow beam and the broad beam, the UE may conclude that the other one of the narrow beam and the broad beam does not have to be subject to detection. Accordingly, time (and other resources) necessary for beam detection can be saved.

In a third aspect, there is provided a computer program product comprising program code portions for performing the method of the first and second aspects, when the computer program product is executed on one or more computing devices. The computer program product may be stored on a computer readable recording medium.

In a fourth aspect, there is provided a transmission point for transmitting discovery-related signals from the transmission point to a user equipment, UE, wherein the transmission point is adapted to transmit at least two distinct discovery-related signals, comprising means adapted to transmit a first one of the at least two discovery-related signals by applying a first beamforming and transmit a second one of the at least two discovery-related signals by applying a second beamforming, wherein the operations of transmitting are performed simultaneously in at least one of a time domain and a space domain, and wherein the first beamforming is different from the second beamforming.

In a first refinement of the fourth aspect, the transmission point may be part of one of a Base Station, BS, an evolved NodeB, eNB, and a Radio Access Network, RAN, controller.

In a fifth aspect, there is provided a User Equipment, UE, for transmitting discovery-related signals from a transmission point to the UE, comprising means adapted to detect at least one discovery-related signal in at least one of a first beam and a second beam from the transmission point based on a received distinction between discovery-related signals on the first beam or the second beam, wherein the first beam is different from the second beam.

Still further, it is to be noted that the method aspects may also be embodied on the apparatus of the fourth and fifth aspects comprising at least one processor and/or appropriate means for carrying out any one of the method steps. Accordingly, the apparatus aspects may attain the same or similar advantages as the method aspects.

BRIEF DESCRIPTION OF THE DRAWINGS

The embodiments of the technique presented herein are described herein below with reference to the accompanying drawings, in which.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practiced in other embodiments that depart from these specific details. For example, the embodiments will primarily be described in the context of $3^{rd}$ generation (3G) or $4^{th}$ generation/long term evolution (4G/LTE); however, this does not rule out the use of the present technique in connection with (future) technologies consistent with 3G or 4G/LTE, be it a wire-bound communications network or a wireless communications network. In addition, the present disclosure may also be implemented, if applicable in a working form, in legacy devices.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Without loss of generality, the present disclosure may be summarized as follows (this does not preclude that the embodiments described herein below may provide generalizations/broadenings with respect to the following summary):

The main idea of this invention is to configure a transmission point to transmit multiple distinct discovery signals (or cell defining signals, sync signals) on either the same or separate time frequency resources by applying narrow beamforming on some discovery signals and broad beamforming on one or more other signals.

In particular, the case has been considered in which one discovery signal is dynamically beamformed with a narrow beam that spatially sweeps the coverage area over time, while another discovery signal is wide and constantly covers the entire coverage area. The broad beam will allow UEs with good coverage to detect the access point in a short amount of time, while the narrow beam will provide coverage to UEs that are not able to detect the broad beam due to bad coverage. The fact that the two discovery signals may collide on the same TFRE is not a problem since the two beams are spatially so different that the impact of interference can be tolerated without major performance impact.

Figure 1:
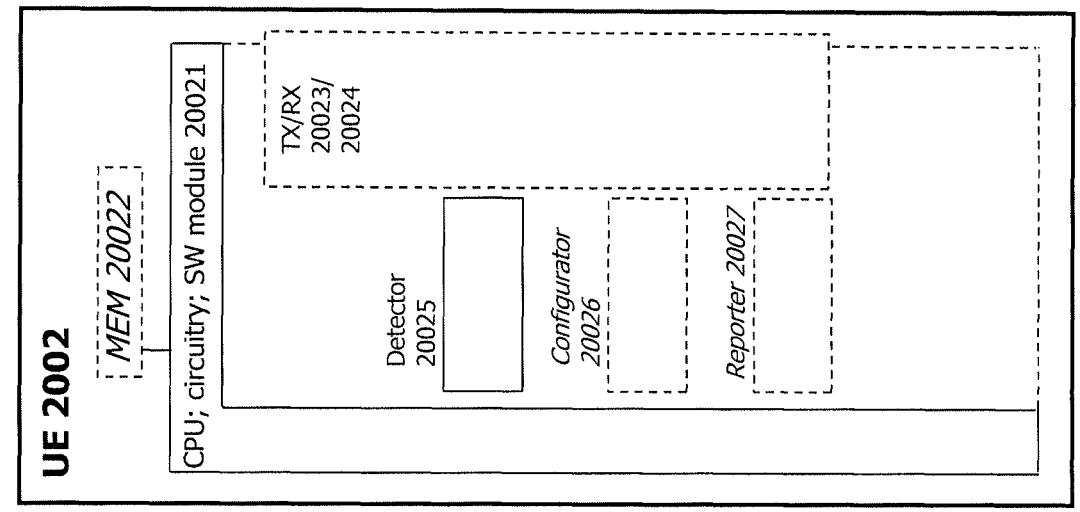
FIG. 1 shows components comprised in an exemplary device embodiment realized in the form of an apparatus (which may reside e.g. in a transmission point and/or a user equipment)
Figure 1:
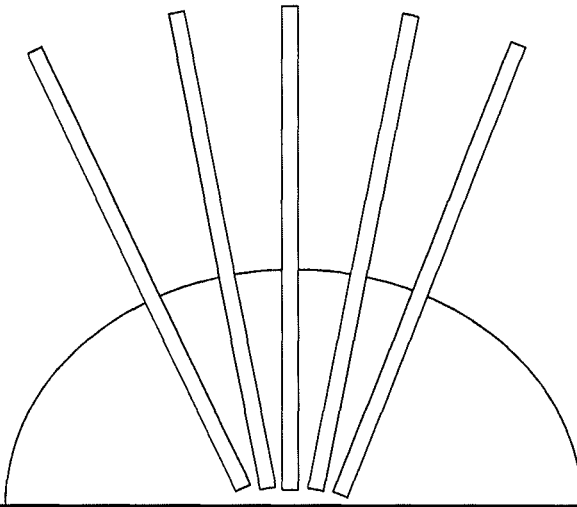

FIG. 1 shows components comprised in an exemplary device embodiment realized in the form of a transmission point 2001 and a user equipment (UE) 2002 comprised in a communication network 20. As an example, the transmission point 2001 may be (or may be a part of) a Base Station (BS) 200, an evolved NodeB (eNB) 200 or a Radio Access Network (RAN) controller 200. As shown in FIG. 1, the transmission point 2001 comprises a core functionality (e.g., one or more of a Central Processing Unit (CPU), dedicated circuitry and/or a software module) 20011, an optional memory (and/or database) 20012, a transmitter 20013 and a receiver 20014. Moreover, the transmission point 2001 comprises an optional antenna array 20015; the antenna array 20015 may comprise or may form the basis of an optional sweeper 20017 and an optional coverer 20018. In addition, the transmission point 2001 may further comprise an optional configurator 20016, and optional multiplexer 20019 and an optional allocator 200110.

Further, the UE 2002 comprised a core functionality (e.g., one or more of a Central Processing Unit (CPU), dedicated circuitry and/or a software module) 20021, an optional memory (and/or database) 20022, a transmitter 20023 and a receiver 20024. Moreover, the UE 2000 may comprise a detector 20025, an optional configurator 20026 and an optional reporter 20027.

In the following paragraphs, it is to be noted that x may assume values 1 and 2 (designating the transmission point or the UE, respectively). As partly indicated by the dashed extensions of the functional blocks of the CPUs 200$x$1, the antenna array 20015, the configurator 20016, the sweeper 20017, the coverer 20018, the multiplexer 20019 and the allocator 200110 (of the transmission point 2001), the detector 20025, the configurator 20026 and the reporter 20027 (of the UE 2002) as well as the respective memories 200$x$2, the respective transmitters 200$x$3 and the respective receivers 200$x$4 may at least partially be functionalities running on the CPUs 200$x$1 or may alternatively be separate functional entities or means controlled by the CPUs 200$x$1 and supplying the same with information. The transmitter components 200$x$3 and receiver components 200$x$4 may be realized to comprise suitable interfaces and/or suitable signal generation and evaluation functions.

The CPUs 200x1 may be configured, for example, using software residing in the memories 200x2, to process various data inputs and to control the functions of the memories 200x2, the transmitters 200x3 and the receivers 200x4 (as well as of the antenna array 20015, the configurator 20016, the sweeper 20017, the coverer 20018, the multiplexer 20019 and the allocator 200110 (of the transmission point 2001), the detector 20025, the configurator 20026 and the reporter 20027 (of the UE 2002)). The memories 200x2 may serve for storing program code for carrying out the methods according to the aspects disclosed herein, when executed by the CPU 200x1.

It is to be noted that the transmitters 200x3 and the receivers 200x4 may be provided as respective integral transceivers, as is indicated in FIG. 1. It is further to be noted that the transmitters/receivers 200x3, 200x4 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the antenna array 20015, the configurator 20016, the sweeper 20017, the coverer 20018, the multiplexer 20019 and the allocator 200110 (of the transmission point 2001), the detector 20025, the configurator 20026 and the reporter 20027 (of the UE 2002), or the respective functionalities, may also be implemented as a chipset, module or subassembly.

Figure 2:
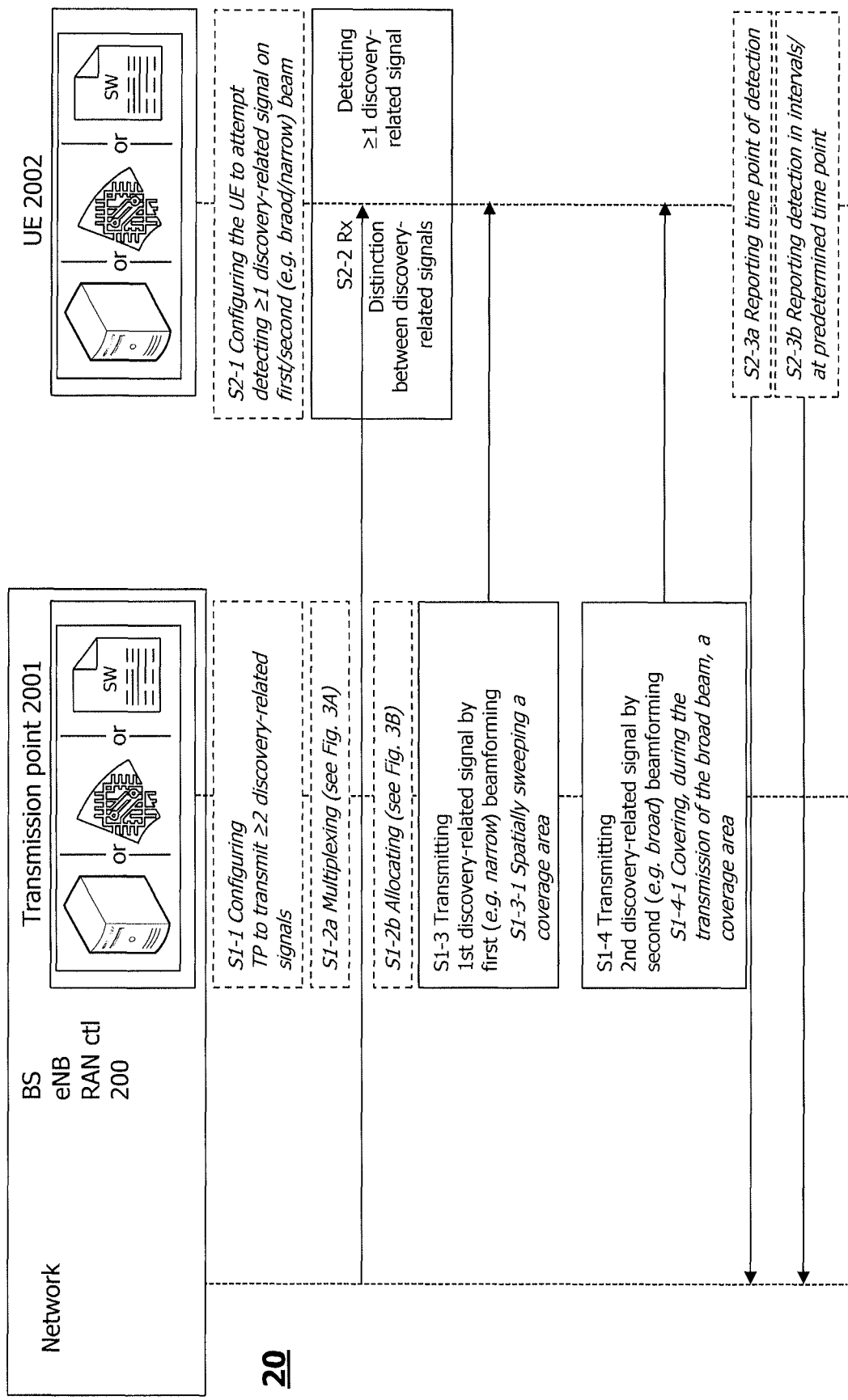
FIG. 2 shows a method embodiment which also reflects the interaction between the components of the apparatus embodiment.

FIG. 2 shows a method embodiment which also reflects the interaction between the components of the device embodiment. In the signalling diagram of FIG. 2, time aspects between signalling are reflected in the vertical arrangement of the signalling sequence as well as in the sequence numbers. It is to be noted that the time aspects indicated in FIG. 2 do not necessarily restrict any one of the method steps shown to the step sequence outlined in FIG. 2. This applies in particular to method steps that are functionally disjunctive with each other.

In an optional step S1-1, the configurator 20016 of the transmission point (TP) 2001 performs configuring the TP to transmit at least two distinct discovery-related signals. Likewise, in an optional step S2-1, the configurator 20026 of the UE 2002 performs configuring the UE to attempt detection of at least one distinct discovery-related signal in a first beam (e.g. a narrow beam) and in a second beam (e.g. a broad beam). As noted above, the steps S1-1 and S2-1 both configure the TP 2001 or the UE 2002, respectively. However, there is no necessity that the steps S1-1 and S2-1 are performed simultaneously. Still further, the discovery-related signals may be discovery signals; cell-defining signals and/or synchronization signals.

In this regard, the configuration of the discovery(-related) signals may include the use of complex-valued scrambling symbol sequences, such as Zadoff-Chu sequences, to generate symbols to multiplex on the physical resource configuration, so that the discovery signals are possibly separable by correlating the received signals with the generated symbol sequence. The symbol sequences may be orthogonal in the sense that the symbols on groups of adjacent TFRE are orthogonal over time and/or frequency. By configuring a system with orthogonal symbol sequences, the separability of the discovery signals is improved.

In a further optional step S1-2a, the multiplexer 20019 of the TP 2001 performs multiplexing each of the at least two distinct discovery-related signals to be transmitted on a same time-frequency resource element, TFRE, in a physical resource configuration using an orthogonal cover code. This scheme will be further detailed herein below with reference to FIG. 3A.

Alternatively, in an optional step S1-2b, the allocator 200110 of the TP 2001 performs allocating the at least two discovery related signals on separate non-overlapping TFREs within split physical resource configurations so that each of the at least two distinct discovery-related signals is transmitted on a different physical resource configuration, wherein each physical resource configuration specifies a subset of all TFRE in the resource element grid. This scheme will be further detailed herein below with reference to FIG. 3B.

Then, in step S2-2, the receiver 20024 and the detector 20025 of the UE 2002 perform detecting, in the received discovery-related signalling, at least one discovery-related signal in at least one of a first beam (e.g. a narrow beam) and a second beam (e.g. a broad beam) from the transmission point based on a received distinction between discovery-related signals on the first beam or the second beam, wherein the first beam is different from the second beam.

The UE 2002 may be informed through signalling (or based on a predetermined contract, i.e. a default setting) about a distinction between the discovery(-related) signals, this distinction may be denoted here as a signal type. Discovery signals that are transmitted with a narrow beam may be labeled with one signal type, and discovery signals that are transmitted with a broad beam may be labeled with another signal type. The signal type may be used by the UE to reduce the complexity of attempting to detect the discovery signals.

The UE 2002 may be configured (possibly by a predetermined contract, i.e. a default setting) to attempt to detect both the narrow beam and broad beam. Upon detection, the UE 2002 is configured (possibly by a predetermined contract, i.e. the default setting) to either take action including to report an identifier of the detected discovery signal to the network, or based on the detected signal strength and possibly in relation to other detected signals strengths decide to abstain to take such action.

As an example, the distinction may reside in the narrow beam's discovery-related signals being assigned to a first subset of sequences and in the broad beam's discovery-related signals being assigned to a second subset of sequences, the first subset being different from the second subset.

In that case, the UE may be configured to temporal filtering of the discovery-related signal based on the second subset of sequences. In other words, the UE 2002 is using the above-described signal type information to determine whether or not to perform temporal filtering of the discovery signal. The broad beam discovery signals may then be labeled with a signal type, such that the UE 2002 can activate temporal filtering since the UE 2002 may assume that the beam does not change over time.

In addition, based on the first and second subsets, the UE may determine to perform repeatedly attempting to detect the discovery-related signal. Alternatively, the UE may determine to perform attempting to detect the discovery related signal only every N-th transmission occurrence, N being an integer greater than 1. Those schemes are useful if the discovery signal is labeled as a broad beam signal type, since the probability of detection is not expected to vary over time when the discovery signal is not beam-cycled. Given a failed detection in one transmission occurrence, the probability is large that there will be a failed detection in the next transmission occurrence, too. This is not necessarily so in the case of beam cycled discovery signals.

Then, in step S1-3, the transmitter 20013 (which may be supplemented by the antenna array 20015) of the TP 2001 performs transmitting a first one of the at least two discovery-related signals by applying a first beamforming (e.g. a narrow beamforming). Still further, in step S1-4, the transmitter 20013 (which may be supplemented by the antenna array 20015) of the TP 2001 performs transmitting a second one of the at least two discovery-related signals by applying a second beamforming (e.g. a broad beamforming). The steps S1-3 and S1-4 are performed simultaneously in at least one of a time domain and a space domain; further, the first beamforming is different from the second beamforming.

The first beamforming on side of the TP 2001 and the first beam on side of the UE 2002 may be a narrow beam (forming). Here, in an optional step S1-3-1, the sweeper 20017 of the TP 2001 performs, when applying narrow beam forming, spatially sweeping a coverage area of the transmission point 2001.

In that case, the narrow beam may be configured to sweep at least one of different azimuth angles and elevation angles over time. In addition, the narrow beam may be based on a respective column of a discrete Fourier transform (DFT) matrix or a Vandermonde matrix corresponding to an antenna array 20015 of the transmission point. In other words, at least one discovery signal may be transmitted with a narrow beam with the intent to achieve a beamforming gain if the UE 2002 is placed in the direction of the main lobe of the beam. The narrow beam may sweep different azimuth and or elevation angles over time to provide coverage for the whole coverage area of the access point. The narrow beams may be based on columns in a DFT matrix, to ensure that the beams are very narrow, and thus provide large beamforming gain.

Still further, on side of the TP 2001, a separate reference signal sequence may be used for each beam pointing direction within a sweep of the narrow beam. Complementarily, the UE 2002 may identify an identifier for the beam pointing direction discovered by the UE and signals back the identifier to the network. In other words, a separate reference signal sequence may be used for each beam pointing direction within a sweep of the discovery signals with the narrow beam, such as a separate Zadoff-Chu sequence, in order for the UE to identify and signal back to the network an identifier for the beam direction it discovered.

Alternatively, on side of the TP 2001, a same reference signal sequence may be used in each beam sweep. Complementarily, the UE 2002 may coherently combine the received discovery-related signal over several discovery-related signal occasions. In other words, the same reference signal sequence may be used in each beam sweep in order for the UE to coherently combine the received discovery signal over several discovery signal occasions in order to increase the received power.

Still further, the second beamforming on side of the TP 2001 and the second beam on side of the UE 2002 may be a broad beam(forming). Here, in an optional step S1-4-1, applying broad beam forming may comprise covering, during the transmission of the broad beam, a coverage area of the transmission point.

If so, the broad beam may be generated by transmitting on one single antenna element of an antenna array 20015 of the transmission point. Specifically, the one single antenna element may be changed over time within the antenna array. In other words, at least one other discovery signal may transmitted with a broad beam with the intent to achieve instant coverage for UEs that have sufficiently strong link but are not located in the main lobe of the narrow beam. The broad beam may be generated by transmitting on one single antenna element. For example, the single antenna element may be changed within the array over time in order to achieve spatial diversity.

Alternatively, the broad beam may be generated by transmitting on all antenna elements of the antenna array while applying a pseudo-random phase shift to each antenna element in the antenna array. In other words, the broad beam may be created by transmitting from the entire array but applying a (predetermined) pseudo-random phase shift to each antenna element in the array in order to make the transmitted signals from each antenna element add up incoherently and thus create a broader beam.

Moreover, the broad beam may have significantly lower power in the direction of the narrow beam than in the other directions. That is, the broad beam may contain a (near) null in the direction of the main lobe of the narrow beam so as to reduce the interference generated in that direction.

In an optional step S2-3a, the reporter 20027 of the UE 2002 performs reporting, to the network 20, a point in time at which the discovery-related signal was received. The point in time may be an absolute point in time taken from a source known to both the network and the UE or a relative point in time relative to the point in time of reporting. In other words, the UE 2002 may report the time when the discovery signal was detected so that the network can determine the detected beam direction. The reported time may be an absolute time taken from a source known to both network 20 and UE 2002, or a relative time relative to the time of reporting.

Alternatively, in an optional step S2-3b, the reporter 20027 of the UE 2002 performs reporting, to the network 20, detection of the discovery-related signal at a predetermined point in time and/or a predetermined interval in relation to the point in time of detection. In other words, the UE 2002 may report detection of discovery signal at a predetermined point or interval in time in relation to the point of detection so that the network may determine the beam pointing direction based on reporting time.

In other words, one possible application is to abstain to report sufficiently weak discovery signals to reduce uplink reporting overhead. As an example, reporting of detected discovery signal includes information on the signal strength, which may be very useful information for the network in radio resource management and link adaptation management. In yet another example, the reporting contains information on the time of measurement, which is particularly useful in the case of narrow beams discovery signals since it allows the network to locate the UE spatially through the used discovery signal beam at the time of transmission.

Still further, on side of the UE 2002, if the UE 2002 detects one of the narrow beam and the broad beam, the UE may conclude that the other one of the narrow beam and the broad beam does not have to be subject to detection. In other words, the UE 2002 may be informed through signalling (or based on a predetermined contract, i.e. default setting) about possible dependencies between discovery(-related) signals, so that the UE 2002 can assume which broad beam and narrow beams originate from the same transmission point 2001. If the UE 2002 detects the narrow beam, it may then conclude that there is no need to try to also detect the broad beam since the transmission point may be identified through the narrow beam. Similarly, if the UE 2002 detects the broad beam there may be no need to try to detect the narrow beam associated with the same transmission point.

Figure 3A:
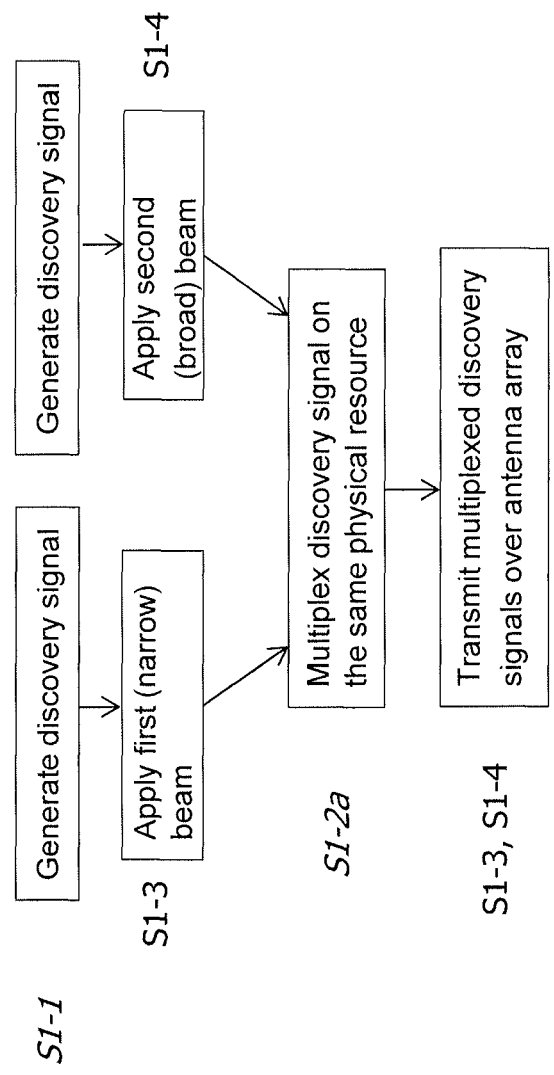
FIG. 3A shows a first implementation example pertaining to multiplexing of discovery-related signals on the same physical resource.

FIG. 3A shows a first implementation example pertaining to multiplexing of discovery-related signals on the same physical resource.

In this regard, each of the at least two distinct discovery-related signals may be configured to be transmitted on time-frequency resource elements, TFREs, within a physical resource configuration, wherein the physical resource configuration specifies a subset of all TFRE in the resource element grid. If so, the transmission on the TFREs may be performed with different levels of non-zero power for the at least two distinct discovery-related signals.

In other words, the present disclosure treats the transmission of multiple discovery signals from the (active) antenna array 20015 on a physical resource configuration. That is, a physical resource configuration is a set of TFREs in the resource element grid. Each of the multiple discovery signals may be configured to be transmitted on all TFREs in the physical resource configuration, although possibly with different non-zero power.

Still further, the multiple discovery signals may be transmitted on the same TFREs but using an orthogonal cover code, so that they are still completely orthogonal but take up fewer TFREs than a pseudo-orthogonal multiplexing.

Figure 3B:
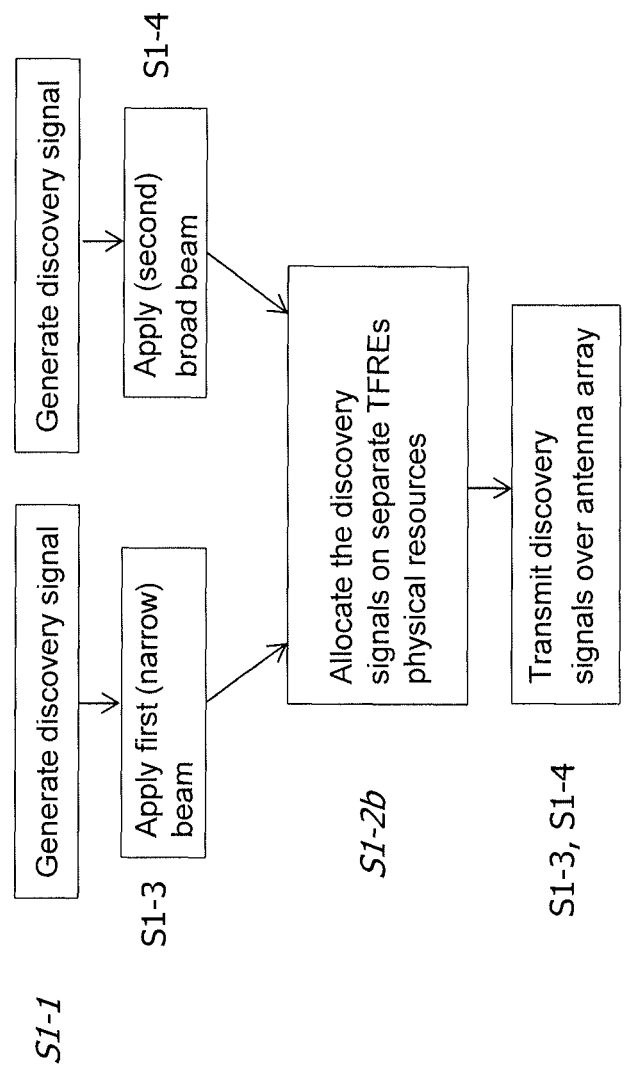
FIG. 3B shows a second implementation example pertaining to allocation of discovery-related signals on separate physical resources.

FIG. 3B shows a second implementation example pertaining to allocation of discovery-related signals on separate physical resources.

In other words, the TFREs within a physical resource configuration may be split up so that each of the multiple discovery signals is transmitted on different TFREs. That is, the said multiple discovery signals may be transmitted on orthogonal or non-orthogonal resources.

Here, more TFREs may be allocated to the narrow beam than the broad beam; conversely, more TFREs may be allocated to the broad beam than the narrow beam. In other words, if the multiple discovery signals are to be transmitted onto separate TFREs, more TFREs are allocated to the narrow beam than the broad beam in order to provide better coverage for coverage-limited UEs; conversely, if more TFREs are allocated to the broad beam, it may be ascertained that more UEs are able to speedily detect the broad beam discovery signal.

From a more general point of view, the narrow beam may be transmitted with higher power that the broad beam; conversely, the broad beam is transmitted with higher power that the narrow beam. That is, multiple discovery signals may be transmitted with different power to allow for optimization of the narrow vs broad beam uptake. In one example, more power is given to the narrow beam to ensure that the coverage is not compromised in the cell. In a different example, more power is given to the broad beam to ensure that more UEs are able to speedily detect the broad beam discovery signal.

Still further, plural narrow beams may be multiplexed along with the broad beam. In this case, the different narrow beams may be orthogonal and point in well-separated angles to mitigate or reduce interference between the beams. The advantage of using multiple narrow beams on the same physical resource is that the periodicity of the beam cycling can be reduced.

Moreover, plural narrow beams may be beamformed with a beamformer having at least two strong lobes (e.g. grating lobes). As an advantage, a larger space may be covered in a shorter time.

Still further, each of the multiple distinct discovery(-related) signals may comprise the same class of discovery signals, for instance the Discovery Reference Signal (DRS) or a Channel State Information Reference Signal (CSI-RS) in $4^{th}$ Generation/Long Term Evolution (4G/LTE), that is, they may be assumed to be transmitted using the same radio access technology (RAT), such as 4G/LTE or 3G.

Furthermore, each of the multiple distinct discovery(-related) signals may be assumed to be transmitted using the same carrier frequency. That is, they may be transmitted on the same frequency band and, if carrier aggregation is used, on the same component carrier (CC). In addition, the multiple distinct discovery(-related) signals may be assumed to be transmitted from the same antenna array.

The total coverage area of the transmission point 2001 may be defined as the union of the coverage area of each of the multiple distinct discovery signals, so that all discovery signals transmitted by the transmission point may essentially define the uptake area of the transmission point 2001, e.g., the cell. In some embodiments, each of the multiple distinct discovery signals may be mapped to a single cell indicator value, such as a physical cell indicator (PCI) in 4G/LTE. In some such embodiments, although the multiple distinct discovery signals may be mapped to the same cell indicator value, they may further be mapped to different virtual cell indicator values, such as the virtual cell ID (VCID) in 4G/LTE.

The present disclosure provides one or more of the following advantages:
- Facilitating good coverage for coverage limited UEs while at the same time maintaining a short detection time for UEs with better coverage.
- If the discovery signals are multiplexed on the same TFREs, this may be accomplished without compromising on the number of physical resources put on the discovery signalling.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A method for transmitting discovery-related signals from a transmission point to a user equipment (UE), wherein the transmission point is configured to transmit at least two distinct discovery-related signals, the method being performed in the transmission point and the method comprising:
   transmitting a first one of the at least two distinct discovery-related signals by beamforming is narrow beamforming with a narrow beam; and
   transmitting a second one of the at least two distinct discovery-related signals by beamforming with a broad beam,
   wherein the transmitting steps are performed simultaneously in at least one of a time domain and a space domain, and wherein the broad beam has a null in a direction of the narrow beam.

2. The method according to claim 1, wherein at least one of the following applies:
   transmitting in the time domain comprises transmitting a discovery-related signal such that the discovery-related signal covers the same spatial region over time; and transmitting in the space domain comprises transmitting the discovery-related signal such that the discovery-related signal covers different spatial regions at different times.

3. The method according to claim 1, wherein at least one of the following applies:
the narrow beam is configured to sweep at least one of different azimuth angles and elevation angles over time; and
the narrow beam is based on a respective column of one of:
a discrete Fourier transform (DFT) matrix; and
a Vandermonde matrix corresponding to an antenna array of the transmission point.

4. The method of claim 3, wherein a separate reference signal sequence is used for each beam pointing direction within a sweep of the narrow beam.

5. The method according to claim 3, wherein at least one of the following applies:
the broad beam is generated by transmitting on one single antenna element of the antenna array of the transmission point, wherein the one single antenna element is changed over time within the antenna array; and
the broad beam is generated by transmitting on all antenna elements of the antenna array while applying a pseudo-random phase shift to each antenna element in the antenna array.

6. The method of claim 1, wherein each of the at least two distinct discovery-related signals is transmitted on time-frequency resource elements (TFREs) within a physical resource configuration, and wherein the physical resource configuration specifies a subset of all TFREs in a resource element grid.

7. The method of claim 6, wherein the transmission on the TFREs is performed with different levels of non-zero power for the at least two distinct discovery-related signals.

8. The method of claim 1, further comprising:
allocating the at least two distinct discovery-related signals on separate non-overlapping time-frequency resource elements (TFREs) within split physical resource configurations so that each of the at least two distinct discovery-related signals is transmitted on a different physical resource configuration, wherein each physical resource configuration specifies a subset of all TFREs in a resource element grid.

9. The method of claim 8, wherein more TFREs are allocated to the narrow beam than the broad beam, or more TFREs are allocated to the broad beam than the narrow beam.

10. The method of claim 1, further comprising:
multiplexing each of the at least two distinct discovery-related signals to be transmitted on a same time-frequency resource element (TFRE) in a physical resource configuration using an orthogonal cover code.

11. The method of claim 1, wherein the narrow beam is transmitted with higher power than the broad beam, or the broad beam is transmitted with higher power than the narrow beam.

12. The method of claim 1, wherein plural narrow beams are multiplexed along with the broad beam, or beamformed with a beamformer having at least two strong lobes.

13. A method for receiving discovery-related signals from a transmission point, the method being performed in a user equipment (UE) and the method comprising:
detecting, in discovery-related signaling, at least one discovery-related signal in at least one of a first beam and a second beam from the transmission point based on a received distinction between discovery-related signals on the first beam or the second beam, wherein the first beam is a narrow beam and the second beam is a broad beam, and wherein the broad beam has a null in a direction of the narrow beam.

14. The method of claim 13, wherein the narrow beam's discovery-related signals are assigned to a first subset of sequences and the broad beam's discovery-related signals are assigned to a second subset of sequences, the first subset being different from the second subset.

15. The method of claim 14, wherein the UE is configured to temporally filter a discovery-related signal based on the second subset of sequences.

16. The method of claim 14, wherein, if the UE detects one of the narrow beam and the broad beam, the UE concludes that the other one of the narrow beam and the broad beam does not have to be subject to detection.

17. The method of claim 13, further comprising:
reporting, to a network, a point in time at which a discovery-related signal was received, wherein the point in time is one of:
an absolute point in time taken from a source known to both the network and the UE; and
a relative point in time relative to the point in time of reporting.

18. The method of claim 17, wherein the UE identifies an identifier for a beam pointing direction discovered by the UE and signals the identifier back to the network.

19. The method of claim 13, wherein the UE coherently combines a discovery-related signal over several discovery-related signal occasions.

20. A transmission point configured for transmitting discovery-related signals from the transmission point to a user equipment (UE), wherein the transmission point comprises:
transceiver circuitry configured to transmit at least two distinct discovery-related signals; and
processing circuitry operatively associated with the transceiver circuitry and configured to:
transmit, via the transceiver circuitry, a first one of the at least two distinct discovery-related signals by beamforming with a narrow beam; and
transmit, via the transceiver circuitry, a second one of the at least two distinct discovery-related signals by beamforming with a broad beam,
wherein the transmit operations are performed simultaneously in at least one of a time domain and a space domain, and wherein the broad beam has a null in a direction of the narrow beam.

21. A User Equipment (UE) configured for receiving discovery-related signals from a transmission point, the UE comprising:
transceiver circuitry configured to receive the discovery-related signals; and
processing circuitry operatively associated with the transceiver circuitry and configured to:
detect at least one discovery-related signal in at least one of a first beam and a second beam from the transmission point based on a received distinction between discovery-related signals on the first beam or the second beam,
wherein the first beam is a narrow beam and the second beam is a broad beam, and wherein the broad beam has a null in a direction of the narrow beam.

* * * * *